(12) United States Patent
Lanciotti

(10) Patent No.: US 12,467,506 B2
(45) Date of Patent: Nov. 11, 2025

(54) COUPLING SYSTEM BETWEEN AN OPERATING MACHINE AND A PLANETARY GEARBOX

(71) Applicant: DINAMIC OIL S.P.A., Bomporto (IT)

(72) Inventor: Eris Lanciotti, Bomporto (IT)

(73) Assignee: DINAMIC OIL S.P.A., Bomporto (IT)

( * ) Notice: Subject to any disclaimer, the term of this patent is extended or adjusted under 35 U.S.C. 154(b) by 538 days.

(21) Appl. No.: 17/947,333

(22) Filed: Sep. 19, 2022

(65) Prior Publication Data

US 2023/0089627 A1 Mar. 23, 2023

(30) Foreign Application Priority Data

Sep. 20, 2021 (IT) .................. 102021000024089

(51) Int. Cl.
*F16D 1/092* (2006.01)
*H02K 7/00* (2006.01)
*H02K 7/116* (2006.01)

(52) U.S. Cl.
CPC ............ *F16D 1/092* (2013.01); *H02K 7/003* (2013.01); *H02K 7/116* (2013.01)

(58) Field of Classification Search
CPC .... F16D 1/09; F16D 1/092; F16D 2001/0903; F16D 2001/0906; F16D 2001/103; H02K 7/003; H02K 7/116
See application file for complete search history.

(56) References Cited

U.S. PATENT DOCUMENTS

| 1,629,949 | A | * | 5/1927 | Caffarello | F16D 1/02 464/178 |
| 3,033,597 | A | * | 5/1962 | Miller | F16D 1/092 403/16 |
| 3,186,188 | A | * | 6/1965 | Chew | F16D 1/09 464/177 |
| 4,337,406 | A | * | 6/1982 | Binder | H02K 7/003 403/287 |
| 4,646,411 | A | * | 3/1987 | Hankins | F16D 1/092 416/146 R |
| 6,056,473 | A | * | 5/2000 | Schafer | F16D 1/097 403/374.2 |
| 6,390,723 | B1 | * | 5/2002 | Schafer | F16D 1/097 403/374.2 |

FOREIGN PATENT DOCUMENTS

| FR | 874674 A | * | 8/1942 | ............ F16D 1/092 |
| WO | WO-2016156272 A1 | * | 10/2016 | ............ F16D 1/076 |

* cited by examiner

*Primary Examiner* — Josh Skroupa
(74) *Attorney, Agent, or Firm* — ASLAN LAW, P.C.

(57) ABSTRACT

A coupling system between an operating machine and a planetary gearbox. The coupling system comprising an axially rotatable machine shaft of an operating machine; and a slow gearbox shaft of a planetary gearbox connectable integrally in rotation with the machine shaft in an operational configuration. The machine shaft and the slow gearbox shaft comprise a first coupling portion and a second coupling portion, respectively, substantially truncated cone-shaped and complementary to each other, the first coupling portion and the second coupling portion being conically coupled to each other in the operational configuration.

11 Claims, 3 Drawing Sheets

COUPLING SYSTEM BETWEEN AN OPERATING MACHINE AND A PLANETARY GEARBOX

TECHNICAL FIELD

The present invention relates to a coupling system between an operating machine and a planetary gearbox.

BACKGROUND ART

The use of planetary gearboxes in various mechanical applications such as, e.g., in machine tools, self-propelled machines, conveyor belts, and numerous other applications is well known and widespread.

In particular, the use of such devices is convenient whenever the rotational speed of a shaft needs to be reduced for reasons related to the technological process involved, to the safety of use and/or structural limits of the components involved.

For this purpose, a planetary gearbox advantageously allows the ratio between the speeds of two shafts to be changed by the interposition between them of a planetary gear connected thereto.

In this regard, and with particular reference to geometrically coaxial models, a planetary gear comprises a central, axially rotatable sun gear, an internally cogged outer crown gear and a plurality of satellite gears in turn axially rotatable and connected to the sun gear via a satellite carrier.

The satellite gears are operationally placed between the central sun gear and the outer crown gear and, due to the connection made by the satellite carrier, are also rotatable around the latter two.

By virtue of the special operation of the planetary gear, therefore, it is sufficient to couple the machine shaft with a respective slow gearbox shaft in the planetary gearbox to let the output shaft rotate at the desired speed. In this regard, various different technical solutions are known to make the coupling between the machine shaft of an operating machine and a planetary gearbox.

A first solution is to employ a grooved connection, which can be made in both the male and female types, provided with axial retaining systems of the input shaft.

This cost-effective technical solution allows the coupling to be made smoothly and simplifies, in particular, the assembly/disassembly of the machine shaft onto/from the slow gearbox shaft.

The grooved connection, however, has significant drawbacks related, in particular, to fatigue wear phenomena, typically referred to as "fretting", which cause premature damage and end of life.

A second type of coupling between the machine shaft and the planetary gearbox is to employ a machine shaft and its slow gearbox shaft which are shaped with a cylindrical cross section and constrained together by flange joints.

In fact, this solution is not affected by the wear issues described earlier and proves to be significantly more resistant against damage and prolonged use over time by quickly and effectively coupling the machine shaft with the slow gearbox shaft.

However, the flange joints are particularly large in size and such, in this case, that they place an undue burden on manufacturing costs and on overall dimensions.

A third known solution involves the use of friction joints to couple the machine shaft to the planetary gearbox.

Friction joints are, in fact, particularly effective for this purpose since, by clamping on the machine shaft in a vice-like manner, they counteract, due to the frictional force exerted, the axial sliding of the latter with respect to the slow gearbox shaft.

Nonetheless, the friction joints greatly complicate disassembly and, in many cases, force the mechanical removal of the entire portion of the machine shaft affected by the joint, with obvious major technical and economic drawbacks.

DESCRIPTION OF THE INVENTION

The main aim of the present invention is to devise a coupling system between an operating machine and a planetary gearbox which is easy to use, particularly in the assembly and disassembly phases, cost-effective and mechanically robust.

Another object of the present invention is to devise a coupling system between an operating machine and a planetary gearbox which can overcome the aforementioned drawbacks of the prior art within the framework of a simple, rational, easy and effective solution that is also easy to use and inexpensive.

The aforementioned objects are achieved by the present coupling system between an operating machine and a planetary gearbox having the characteristics of claim 1.

BRIEF DESCRIPTION OF THE DRAWINGS

Other characteristics and advantages of the present invention will become more apparent from the description of a preferred, but not exclusive, embodiment of a coupling system between an operating machine and a planetary gearbox, illustrated by way of an indicative, yet non-limiting example, in the accompanying tables of drawings in which.

EMBODIMENTS OF THE INVENTION

Figure 1:
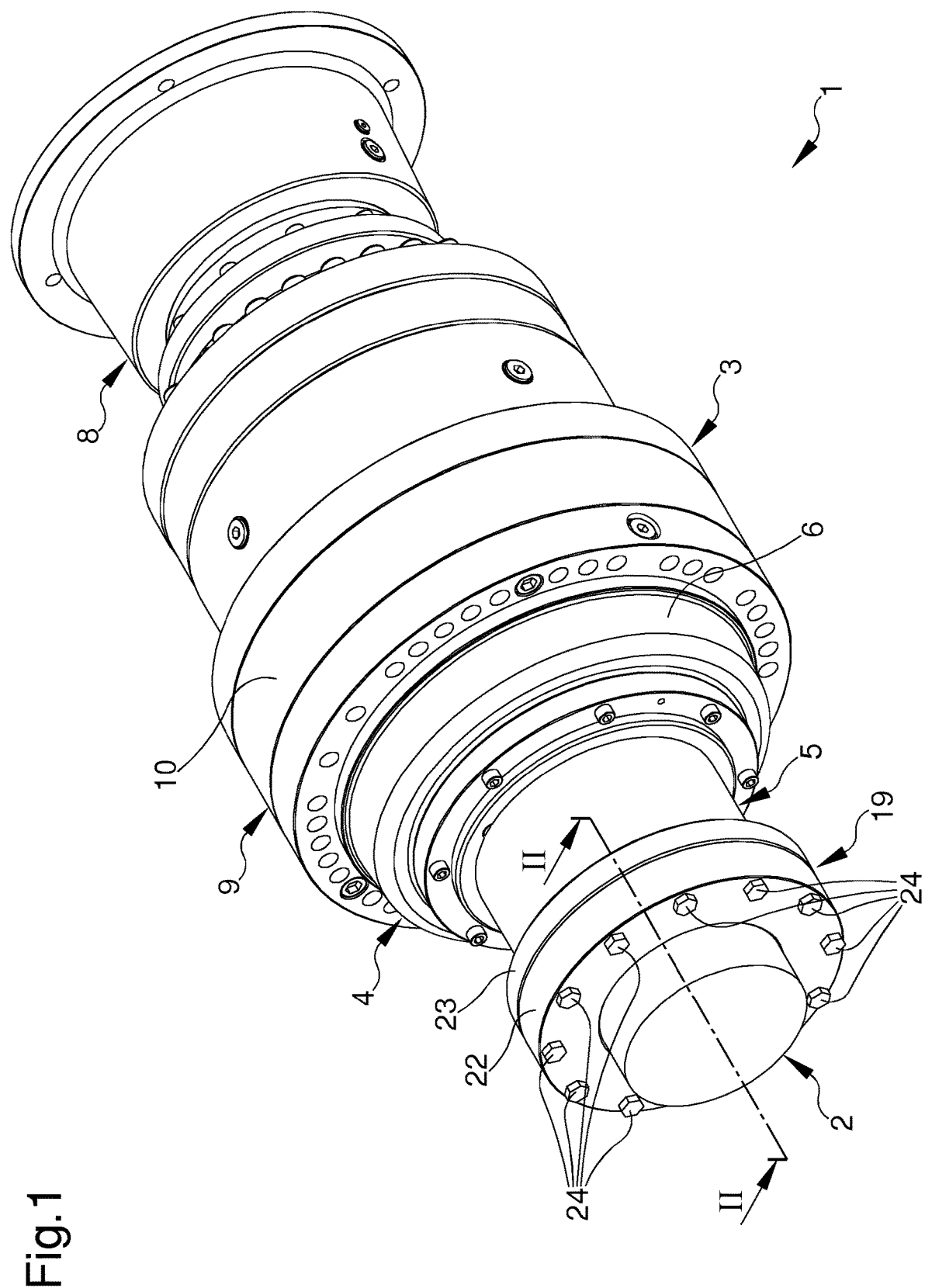
FIG. 1 is an axonometric, overall view of the system according to the invention.

With particular reference to these figures, reference numeral 1 globally indicates a coupling system between an operating machine and a planetary gearbox.

The coupling system between the operating machine and the planetary gearbox 1 comprises at least one axially rotatable machine shaft 2 of an operating machine and at least one slow gearbox shaft 5 of a planetary gearbox 3 connectable integrally in rotation with the machine shaft 2 in an operational configuration.

Specifically, the slow gearbox shaft 5 is associated with at least one planetary gearbox 3.

In this regard, the planetary gearbox 3 comprises at least one support 4 containing the slow gearbox shaft 5.

Specifically, the support 4 comprises a load-bearing structure 6 of the slow gearbox shaft 5 fixed in rotation with respect to the latter.

In detail, the slow gearbox shaft 5 is at least partly contained within the load-bearing structure 6.

Again, the support 4 comprises a plurality of friction reducing elements 7 placed between the load-bearing structure 6 and the slow gearbox shaft 5 and adapted to allow the latter to rotate with respect to the former by reducing the friction thereof.

According to the preferred embodiment, the friction reducing elements 7 are of the type of roller and/or ball rolling bearings.

Friction reducing elements 7 of a different kind, such as, e.g., of the type of sliding bearings or other types still known to the expert in the field cannot however be ruled out, which allow reducing the friction of the slow gearbox shaft 5 with respect to the load-bearing structure 6.

The planetary gearbox 3 then comprises:
at least one output support 8 containing at least one output gearbox shaft which can be connected integrally rotation to an external equipment;
at least one reduction support 9 placed between the support 4 and the output support 8 and containing at least one planetary gear 10 operationally connected to the slow gearbox shaft 5 and to the output gearbox shaft to drive the latter in rotation at a substantially lower speed than that of the slow gearbox shaft 5.

In other words, with the exception of the slow gearbox shaft 5, the planetary gearbox 3 consists of a gearbox of the conventional type.

In addition, according to a possible embodiment shown in the figures, the planetary gearbox 3 is of the pendulum type, that is, it is not arranged in direct contact with the ground and is, therefore, supported by the machine shaft 2. Alternatively, the planetary gearbox 3 is provided with at least one holding body, not shown in the figures, which can be fixed to the ground.

For example, the holding body is of the type of one or more flanges.

This, therefore, allows the planetary gearbox 3 to be fixed to the ground to hold the weight of the entire system 1.

According to the invention, the machine shaft 2 and the slow gearbox shaft 5 comprise at least one first coupling portion 11 and at least one second coupling portion 12, respectively, which are substantially truncated cone-shaped and complementary to each other.

This means that the first coupling portion 11 and the second coupling portion 12 are shaped in such a way that the machine shaft 2 and the slow gearbox shaft 5 fit each other to size by being connected to each other.

In particular, the first coupling portion 11 is made in a single body piece with the machine shaft 2.

A coupling portion 11 coupled to the machine shaft 2 in a removable manner cannot however be ruled out from the scope of protection.

In other words, it cannot be ruled out that the coupling portion 11 could be of the type of a truncated-cone bushing which can be attached to a machine shaft, such as a cylindrical one.

According to the invention, the first coupling portion 11 and the second coupling portion 12 are conically coupled to each other in the operational configuration.

It is specified that the expression "conically" is intended to mean that the machine shaft 2 and the slow gearbox shaft 5 are forced into each other in an operational configuration thus making a particularly stable coupling between them due to the conformation of the first coupling portion 11 and the second coupling portion 12 and due to the friction that is defined between the latter.

In this regard, one of either the first coupling portion 11 or the second coupling portion 12 is a truncated-cone end and the other of either the first coupling portion 11 or the second coupling portion 12 is a truncated-cone housing.

This means that the truncated-cone end is fitted to size inside the truncated-cone housing in the operational configuration to couple the machine shaft 2 to the slow gearbox shaft 5.

According to the preferred embodiment, the first coupling portion 11 is the truncated-cone end and the second coupling portion 12 is the truncated-cone housing.

In other words, the first coupling portion 11 is the male and the second coupling portion 12 is the female.

In this embodiment, the housing that forms the second coupling portion 12 has a truncated-cone conformation with decreasing cross section in the direction of moving close to the planetary gear 10.

In fact, this allows the first coupling portion 11 to be smoothly fitted inside. The alternative embodiment cannot however be ruled out wherein the first coupling portion 11 be the truncated-cone housing and the second coupling portion 12 be the truncated-cone end.

This means that it cannot be ruled out that the first coupling portion 11 be the female and the second coupling portion 12 be the male.

Thus, in the latter case, the second coupling portion 12 has a truncated-cone conformation with decreasing cross section in the direction of moving away from the planetary gear 10.

Advantageously, in the operational configuration, the longitudinal axes of the first coupling portion 11 and of the second coupling portion 12 are substantially overlapping.

This implies that, in the operational configuration, the machine shaft 2 and the slow gearbox shaft 5 rotate around a common axis of rotation R coincident with the longitudinal axes thereof.

Figure 2:
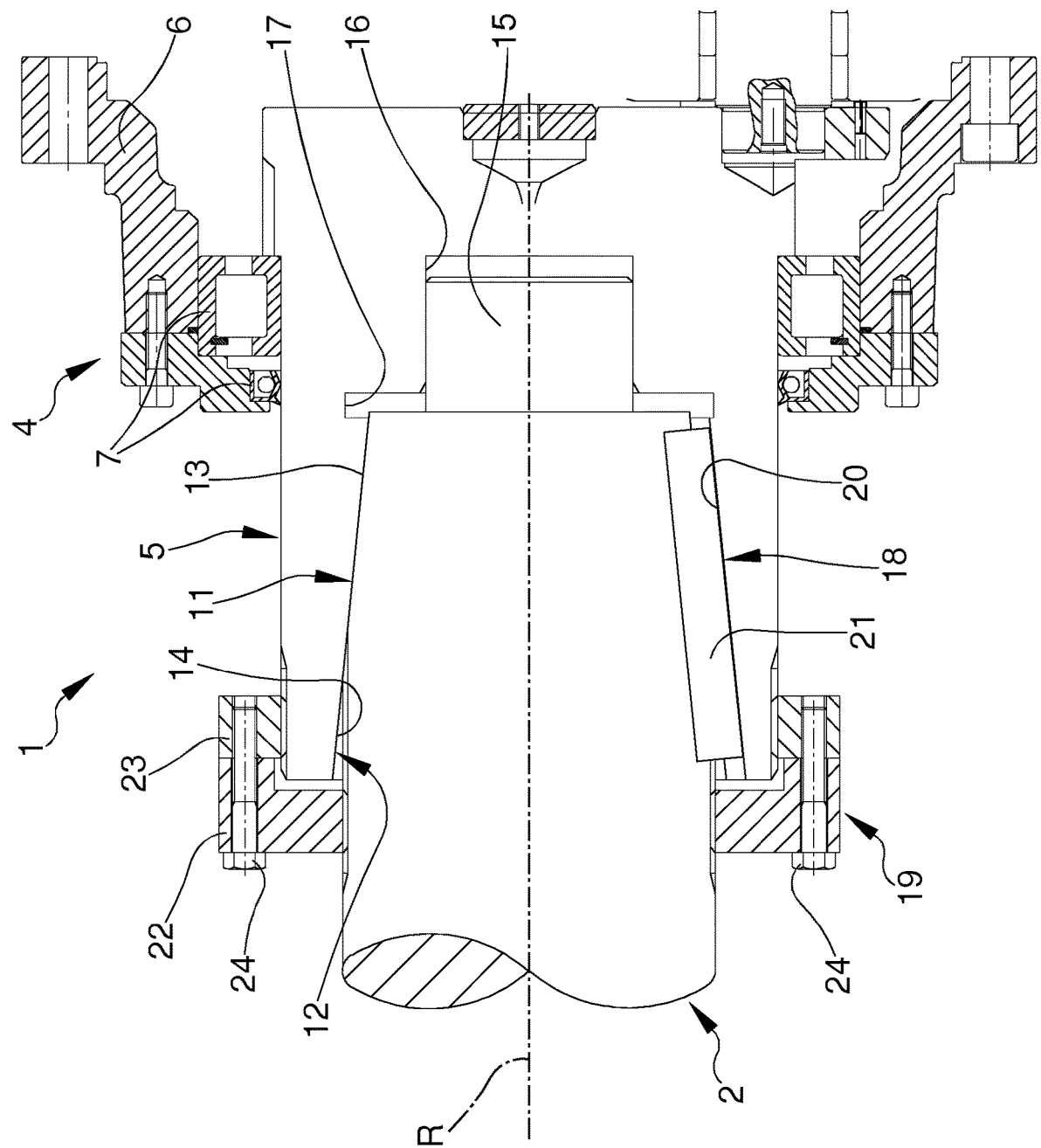
FIG. 2 is a side sectional view of a detail of the system according to the invention.

As visible in FIG. 2, the first coupling portion 11 is provided with at least one first coupling surface 13 and the second coupling portion 12 is provided with at least one second coupling surface 14, the first coupling surface 13 contacting substantially at every point thereof the second coupling surface 14 in the operational configuration.

Conveniently, the machine shaft 2 and the slow gearbox shaft 5 comprise at least one stop portion 15 and at least one abutment portion 16 respectively, which are shaped substantially as a right cylinder and coupled to each other in the operational configuration.

Conveniently:
the stop portion 15 is sized with a smaller cross section than the minimum cross section of the first coupling portion 11; and
the abutment portion 16 is sized with a smaller cross section than the minimum cross section of the second coupling portion 12.

In accordance with the preferred embodiment, the stop portion 15 is arranged at the end of the machine shaft 2, after the first coupling portion 11, and the abutment portion 16 is arranged on the bottom of the housing that forms the second coupling portion 12, to accommodate the stop portion 15 inside itself in the operational configuration.

The fact is emphasized that providing a stop portion 15 and an abutment portion 16 allows, due to the coupling of the latter, effective, simple and immediate centering of the machine shaft 2 on the slow gearbox shaft 5.

According to the preferred embodiment, the slow gearbox shaft 5 comprises a cavity 17 placed between the second coupling portion 12 and the abutment portion 16 and adapted to facilitate the entry of the machine shaft 2 into the slow gearbox shaft 5, thus offsetting the tolerances and clearances of the former with respect to the latter.

For example, the cavity 17 is of the type of a drain.

For example, the sealing element is of the type of a sealing ring.

In this regard, the cavity 17 is made with a substantially circular cross section. In addition, the cavity 17 is sized with greater area than the minimum cross section of the second coupling portion 12.

Again, the cavity 17 is sized with greater area than the cross section of the abutment portion 16.

In addition, the system 1 comprises kinematic constraining means 18, 19 associated with the machine shaft 2 and with the slow gearbox shaft 5 adapted to integrally constrain the latter to each other.

Specifically, the constraining means 18, 19 comprise constraining means of the relative rotation 18 of the machine shaft 2 with respect to the slow gearbox shaft 5.

In this regard, the constraining means of the relative rotation 18 comprise at least one housing seat 20 formed on at least one of either the first coupling portion 11 or the second coupling portion 12.

In detail, the housing seat 20 is formed longitudinally along at least one of either the first coupling portion 11 or the second coupling portion 12.

Again, the housing seat 20 is made with an elongated shape.

In addition, the constraining means of the relative rotation 18 comprise at least one constraining element 21 associable with the other of either the first coupling portion 11 or the second coupling portion 12 and fitted inside the housing seat 20 in the operational configuration, to transmit the rotation between the machine shaft 2 and the slow gearbox shaft 5.

In particular, the constraining element 21 is conformed as to be fitted snugly inside the housing seat 20.

Consequently, the constraining element 21, as it is subjected to shear stresses due to the rotation of at least one of either the machine shaft 2 or the slow gearbox shaft 5, allows transmitting to the other of either the machine shaft 2 or the slow gearbox shaft 5 the torque necessary to set it into rotation.

Figure 3:
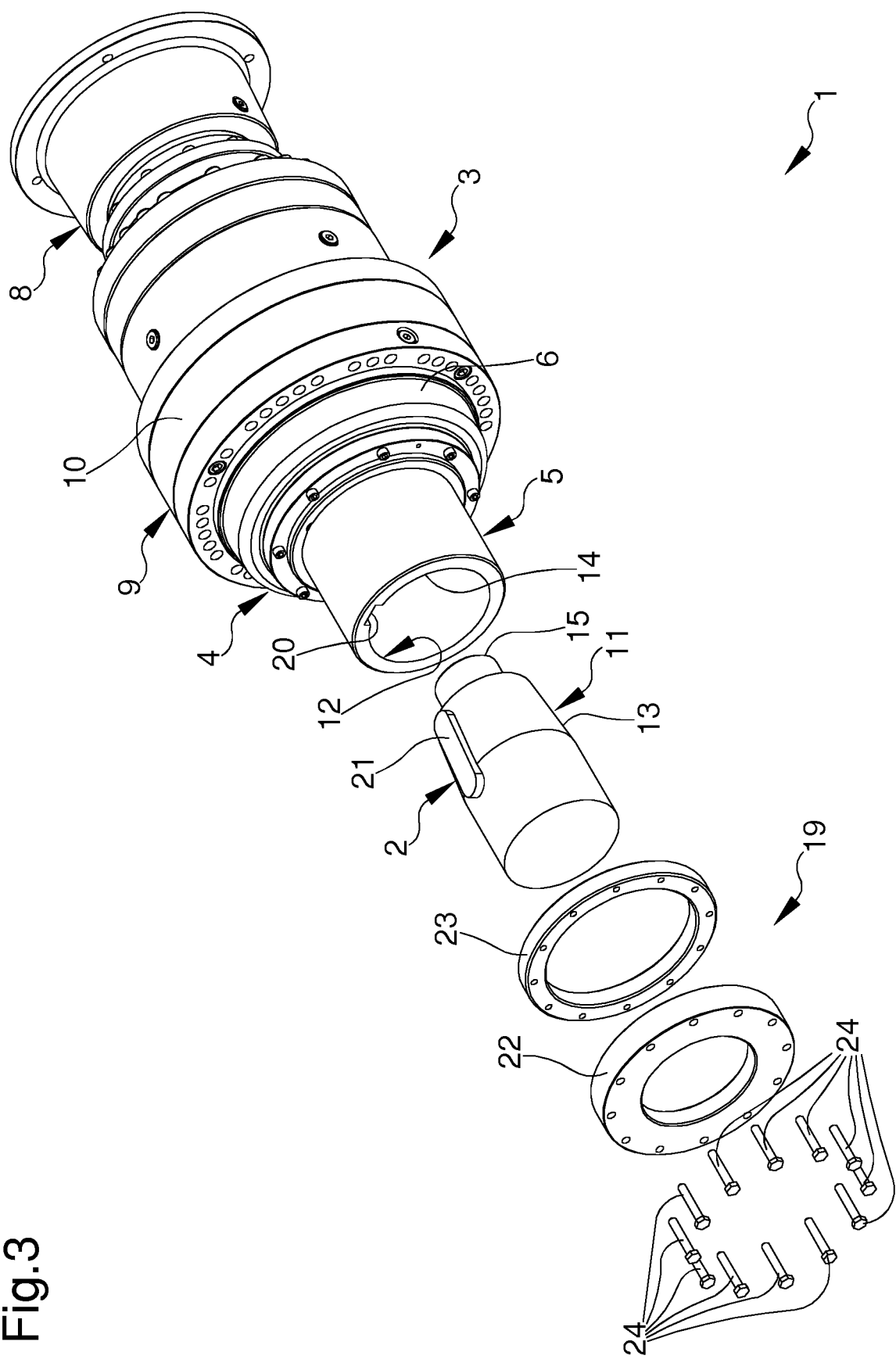
FIG. 3 is an exploded view of the system according to the invention.

According to a first embodiment, the constraining means of the relative rotation 18 comprise a single housing seat 20 formed on the second coupling portion 12. In this case, as visible in FIG. 3, the constraining element 21 and the machine shaft 2 are made in a single body piece.

Specifically, according to this first embodiment, the constraining element 21 is associated with the first coupling portion 11 and protrudes therefrom in the transverse direction.

In other words, the constraining element 21 is of the type of a protruding nosepiece.

Thus, in this case, the constraining element 21 is inserted within the single housing seat 20 due to the coupling between the first coupling portion 11 and the second coupling portion 12.

According to a second embodiment, which is an alternative to the previous one, the constraining means of the relative rotation 18 comprise two housing seats 20, one formed on the first coupling portion 11 and the other formed on the second coupling portion 12.

In the latter case, therefore, the constraining element 21 and the machine shaft are made as separate bodies from each other.

Specifically, the constraining element 21 is of the type of a tab.

For example, the constraining element 21 is inserted inside the housing seat 20 formed on the first coupling portion 11 to then also be inserted, in the operational configuration, inside the housing seat 20 made on the second coupling portion 12 due to the coupling between the first coupling portion 11 and the second coupling portion 12.

Again, the constraining means 18, 19 comprise constraining means of the relative axial sliding 19 of the machine shaft 2 with respect to the slow gearbox shaft 5.

In detail, the constraining means of the relative sliding 19 comprise at least one first ring nut 22 associable with the machine shaft 2 and at least one second ring nut 23 associable with the slow gearbox shaft 5.

Specifically, the first ring nut 22 and the second ring nut 23 are coupled to the machine shaft 2 and to the slow gearbox shaft 5, respectively, by threaded connection.

In addition, the constraining means of the relative sliding 19 comprise fastening means 24 coupleable, in the operational configuration, to the first ring nut 22 and to the second ring nut 23 to rigidly fix them to each other.

By operating on the fastening means 24, therefore, it is possible to adjust the resisting force exerted by the constraining means of the relative sliding 19 against the axial sliding of the machine shaft 2 with respect to the slow gearbox shaft 5.

In particular, the fastening means 24 are of the type of screws, bolts or other removable mechanical connecting members known to the expert in the field.

It is pointed out, in this regard, that the fastening means 24 advantageously allow for the generation of additional friction force due to their coupling in the operational configuration to the first ring nut 22 and to the second ring nut 23.

In other words, the fastening means 24 operate in conjunction with the constraining element 21 to transmit torque.

According to another aspect, the present invention also relates to a planetary gearbox 3.

Specifically, the planetary gearbox 3 coupleable to at least one axially rotatable machine shaft 2 of an operating machine comprises at least one second coupling portion 12 which is substantially truncated cone-shaped and complementary with a respective first coupling portion 11 of the machine shaft 2.

In this regard, the first coupling portion 11 and the second coupling portion 12 are conically coupleable to each other in at least one operational configuration. It has in practice been ascertained that the described invention achieves the intended objects.

In particular, the fact is emphasized that the special expedient of providing a machine shaft and a slow gearbox shaft comprising a first coupling portion and a second coupling portion, respectively, which are conformed as a truncated cone and complementary to each other makes it possible to make a coupling between the machine shaft of an operating machine and the planetary gearbox that is easy to use, particularly in the assembly and disassembly phases, cost-effective and mechanically robust.

The invention claimed is:

1. A coupling system comprising:
at least one axially rotatable machine shaft of an operating machine; and
at least one slow gearbox shaft of a planetary gearbox connectable integrally in rotation with said machine shaft in an operational configuration; wherein
wherein said machine shaft and said slow gearbox shaft comprise at least one first coupling portion and at least one second coupling portion, respectively, substantially truncated cone-shaped and complementary to each other, said first coupling portion and said second coupling portion being conically coupled to each other in said operational configuration;

kinematic constraining means associated with said machine shaft and with said slow gearbox shaft adapted to integrally constrain the latter to each other;

wherein said constraining means comprise axial constraining means of the relative axial sliding of said machine shaft with respect to said slow gearbox shaft, and wherein said constraining means of the relative sliding comprise:

at least one first ring nut associable with said machine shaft:

at least one second ring nut associable with said slow gearbox shaft; and fastening means coupleable in the operational configuration to said first ring nut and to said second ring nut to rigidly fix them to each other.

2. The coupling system according to claim 1, wherein said operational configuration the longitudinal axes of said first coupling portion and of said second coupling portion are substantially overlapping.

3. The coupling system according to claim 1, wherein one of either said first coupling portion or said second coupling portion is a truncated-cone end and the other of either said first coupling portion or said second coupling portion is a truncated-cone housing, said truncated-cone end being inserted to size inside said truncated-cone housing in said operational configuration.

4. The coupling system according to claim 1, wherein said first coupling portion is provided with at least one first coupling surface and said second coupling portion is provided with at least one second coupling surface, said first coupling surface contacting substantially at every point thereof with said second coupling surface in said operational configuration.

5. The coupling system according to claim 1, wherein said machine shaft and said slow gearbox shaft comprise at least one stop portion and at least one abutment portion respectively, which are shaped substantially as a right cylinder and coupled to each other in said operational configuration.

6. The coupling system according to claim 5, wherein
said stop portion is sized with a smaller cross section than the minimum cross section of said first coupling portion; and
said abutment portion is sized with a smaller cross section than the minimum cross section of said second coupling portion.

7. The coupling system according to claim 1, wherein said constraining means comprise constraining means of the relative rotation of said machine shaft with respect to said slow gearbox shaft.

8. The coupling system according to claim 7, wherein said constraining means of the relative rotation comprise:

at least one housing seat formed on at least one of either said first coupling portion or said second coupling portion; and at least one constraining element associated with the other of either said first coupling portion or said second coupling portion and inserted inside said housing seat in said operational configuration, to transmit the rotation from said machine shaft to said slow gearbox shaft.

9. A planetary gearbox coupleable to at least one axially rotatable machine shaft of said operating machine of claim 1, wherein the planetary gearbox comprises:

at least one second coupling portion which is substantially truncated cone-shaped and complementary with a respective first coupling portion of said machine shaft, said first coupling portion and said second coupling portion being conically coupleable to each other in at least one operational configuration.

10. The coupling system according to claim 1,
wherein the coupling system is located between the operating machine and the planetary gearbox.

11. A system comprising:
a coupling system;
an operating machine; and
a planetary gearbox, wherein
the coupling system is located between the operating machine and the planetary gearbox,
at least one axially rotatable machine shaft of an operating machine; and
at least one slow gearbox shaft of a planetary gearbox connectable integrally in rotation with said machine shaft in an operational configuration; wherein
wherein said machine shaft and said slow gearbox shaft comprise at least one first coupling portion and at least one second coupling portion, respectively, substantially truncated cone-shaped and complementary to each other, said first coupling portion and said second coupling portion being conically coupled to each other in said operational configuration;
kinematic constraining means associated with said machine shaft and with said slow gearbox shaft adapted to integrally constrain the latter to each other;

wherein said constraining means comprise axial constraining means of the relative axial sliding of said machine shaft with respect to said slow gearbox shaft, and wherein said constraining means of the relative sliding comprise:

at least one first ring nut associable with said machine shaft;

at least one second ring nut associable with said slow gearbox shaft; and fastening means coupleable in the operational configuration to said first ring nut and to said second ring nut to rigidly fix them to each other.

* * * * *